United States Patent
Nishitani et al.

(10) Patent No.: US 11,923,528 B2
(45) Date of Patent: Mar. 5, 2024

(54) NON-AQUEOUS ELECTROLYTE SECONDARY BATTERY

(71) Applicant: Panasonic Intellectual Property Management Co., Ltd., Osaka (JP)

(72) Inventors: Satoshi Nishitani, Osaka (JP); Hiroshi Minami, Osaka (JP); Masaki Deguchi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/471,944

(22) PCT Filed: Dec. 20, 2017

(86) PCT No.: PCT/JP2017/045645
§ 371 (c)(1),
(2) Date: Jun. 20, 2019

(87) PCT Pub. No.: WO2018/123751
PCT Pub. Date: Jul. 5, 2018

(65) Prior Publication Data
US 2020/0091500 A1   Mar. 19, 2020

(30) Foreign Application Priority Data

Dec. 28, 2016 (JP) .................... 2016-254818

(51) Int. Cl.
*H01M 4/131* (2010.01)
*H01M 4/02* (2006.01)
(Continued)

(52) U.S. Cl.
CPC .......... *H01M 4/131* (2013.01); *H01M 4/133* (2013.01); *H01M 4/134* (2013.01); *H01M 4/364* (2013.01);
(Continued)

(58) Field of Classification Search
CPC ...... H01M 4/133; H01M 4/134; H01M 4/364; H01M 4/386; H01M 4/485; H01M 4/587;
(Continued)

(56) References Cited

U.S. PATENT DOCUMENTS

2011/0217599 A1* 9/2011 Yamamoto ............ H01M 4/131
429/188
2011/0269026 A1  11/2011 Zhao et al.
(Continued)

FOREIGN PATENT DOCUMENTS

CN      102224630 A    10/2011
JP      2006-140115 A   6/2006
(Continued)

OTHER PUBLICATIONS

International Search Report dated Apr. 3, 2018, issued in counterpart International Application No. PCT/JP2017/045645 (1 page).
(Continued)

*Primary Examiner* — Brian R Ohara
*Assistant Examiner* — Patrick Marshall Greene
(74) *Attorney, Agent, or Firm* — WHDA, LLP

(57) ABSTRACT

A positive electrode, a negative electrode, and a non-aqueous electrolyte. The negative electrode includes a negative electrode material, a binder, and a thickener, and the negative electrode material includes a lithium silicate phase, and Si particles dispersed in the lithium silicate phase. The ratio of the Si particles in the negative electrode material is 30 mass % or more. The binder includes a poly(meth)acrylic acid, the thickener includes a carboxyalkyl cellulose, and the amount of the poly(meth)acrylic acid relative to 100 parts by mass of the negative electrode material is 0.1 parts by mass or more and 5 parts by mass or less. The non-aqueous electrolyte includes a lithium salt, a non-aqueous solvent, and an acid that exhibits a pKa of 1 to 30 in water at 25° C.

(Continued)

The non-aqueous electrolyte secondary battery can suppress the generation of gas during high-temperature storage, and secure excellent cycle characteristics.

9 Claims, 1 Drawing Sheet

(51) Int. Cl.
- *H01M 4/133* (2010.01)
- *H01M 4/134* (2010.01)
- *H01M 4/36* (2006.01)
- *H01M 4/38* (2006.01)
- *H01M 4/485* (2010.01)
- *H01M 4/587* (2010.01)
- *H01M 4/62* (2006.01)
- *H01M 10/0525* (2010.01)
- *H01M 10/0567* (2010.01)

(52) U.S. Cl.
CPC ........... *H01M 4/386* (2013.01); *H01M 4/485* (2013.01); *H01M 4/587* (2013.01); *H01M 4/622* (2013.01); *H01M 10/0525* (2013.01); *H01M 10/0567* (2013.01); *H01M 2004/027* (2013.01)

(58) Field of Classification Search
CPC ............. H01M 4/622; H01M 10/0525; H01M 10/0567; H01M 2004/027
See application file for complete search history.

(56) References Cited

U.S. PATENT DOCUMENTS

| | | |
|---|---|---|
| 2011/0281179 A1 | 11/2011 | Abe |
| 2016/0268633 A1* | 9/2016 | Schofield .......... H01M 10/0525 |
| 2017/0214041 A1 | 7/2017 | Minami et al. |
| 2017/0309950 A1* | 10/2017 | Minami ................ H01M 4/364 |
| 2018/0013131 A1 | 1/2018 | Yamamoto et al. |
| 2018/0062160 A1* | 3/2018 | Kasamatsu ........... H01M 4/622 |
| 2018/0212234 A1* | 7/2018 | Haufe ............... H01M 10/0525 |
| 2019/0326639 A1* | 10/2019 | Kinoshita ............. H01G 11/64 |
| 2020/0303744 A1* | 9/2020 | Katou ................... H01M 50/46 |

FOREIGN PATENT DOCUMENTS

| | | |
|---|---|---|
| JP | 2011-233351 A | 11/2011 |
| WO | 2015/098050 A1 | 7/2015 |
| WO | 2016/035290 A1 | 3/2016 |
| WO | 2016/121322 A1 | 8/2016 |

OTHER PUBLICATIONS

English Translation of Chinese Report dated Oct. 11, 2021, issued in counterpart CN application No. 201780079850.7. (4 pages).

* cited by examiner

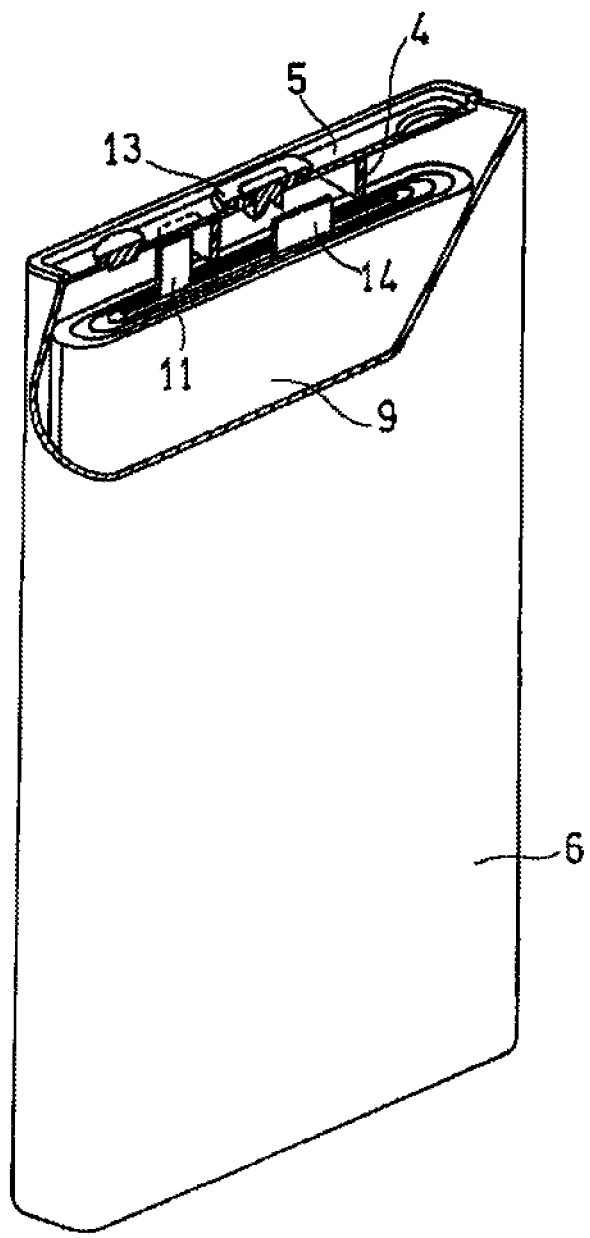

NON-AQUEOUS ELECTROLYTE SECONDARY BATTERY

TECHNICAL FIELD

The present invention relates to a non-aqueous electrolyte secondary battery that uses a negative electrode including lithium silicate in winch a Si phase is dispersed.

BACKGROUND ART

Materials obtained by dispersing a Si phase in lithium silicate are attracting attention as negative electrode active materials of non-aqueous electrolyte secondary batteries because the Si phase can absorb and desorb a large amount of lithium, and are expected to achieve a high capacity.

From the viewpoint of improving the initial charge/discharge efficiency, PTL 1 proposes the use of lithium silicate having a half-width of 0.05° or more of a diffraction peak attributed to the (111) plane in an X-ray diffraction pattern as a negative electrode active material of a non-aqueous electrolyte secondary battery.

Additionally, from the viewpoint of enhancing the opacity and the cycle characteristics of a non-aqueous electrolyte secondary battery that uses a negative electrode active material including a carbon material and silicon oxide. PTL 2 proposes the use of carboxymethyl cellulose, a salt of polyacrylic acid, a styrene-butadiene copolymer, and the like for the negative electrode plate as the thickener and the binder.

CITATION LIST

Patent Literatures

PTL 1: WO 2016/035290
PTL 2: WO 2016/121322

SUMMARY OF INVENTION

When used for a non-aqueous electrolyte secondary battery as the negative electrode active material, a material having a structure in which a particulate Si phase is dispersed in a lithium silicate phase yields a capacity as a result of the Si phase reversibly absorbing and deserting lithium. However, if the ratio of the Si phase is increased to achieve a high capacity, alkalis tend to dissolve into the electrolyte, and the alkalis and the electrolyte react with each other, thus producing a gas. This gas generation is particularly prominent when the battery is stored at a high temperature.

When lithium silicate in which a Si phase is dispersed is used as the negative electrode active material, the flexibility of the negative electrode may be impaired depending on the type, composition, and/or amount of the binder and the thickener, and the cycle characteristics may be reduced.

In view of the foregoing, au aspect of the present disclosure relates to a non-aqueous electrolyte secondary battery including: a positive electrode capable of electrochemically absorbing and desorbing lithium, a negative electrode capable of electrochemically absorbing and desorbing lithium; and anon-aqueous electrolyte,
  wherein the negative electrode includes a negative electrode material, a binder, and a thickener,
  the negative electrode material includes a lithium silicate phase, and silicon particles dispersed in the lithium silicate phase,
  a ratio of the silicon particles in the negative electrode material is 30 mass % or more,
  the hinder includes a poly(meth)acrylic acid,
  the thickener includes a carboxyalkyl cellulose,
  an amount of the poly(meth)acrylic acid relative to 100 parts by mass of the negative electrode material is 0.1 parts by mass or more and 5 parts by mass or less, and
  the non-aqueous electrolyte includes a lithium salt, a non-aqueous solvent that dissolves the lithium salt, and an acid that exhibits a pKa of 1 to 30 in water at 25° C.

It is possible to suppress the generation of gas during high-temperature storage, and secure excellent cycle characteristics in a non-aqueous electrolyte secondary battery that uses a negative electrode material including lithium silicate in which a Si phase is dispersed.

BRIEF DESCRIPTION OF DRAWING

FIG. 1 is a partially cut-away schematic perspective view of a non-aqueous electrolyte secondary battery according to an embodiment of the present invention.

DESCRIPTION OF EMBODIMENT

[Non-Aqueous Electrolyte Secondary Battery]

A non-aqueous electrolyte secondary battery according to an embodiment of the present invention includes a positive electrode capable of electrochemically absorbing and desorbing lithium, a negative electrode capable of electrochemically absorbing and desorbing lithium, and a non-aqueous electrolyte. The negative electrode includes a negative electrode material (hereinafter also referred to as "negative electrode material LSX"), a binder, and a thickener. The negative electrode material LSX includes a lithium silicate phase, and a silicon particles dispersed in the lithium silicate phase. The ratio of the silicon particles in the negative electrode material LSX is 30 mass % or more. The binder includes a poly(meth)acrylic acid, and the thickener includes a carboxyalkyl cellulose. The amount of the poly(meth)acrylic acid relative to 100 parts by mass of the negative electrode material is 0.1 parts by mass or more and 5 parts by mass or less. The moo-aqueous electrolyte includes a lithium salt, a non-aqueous solvent that dissolves the lithium salt, and an acid that exhibits an acid dissociation constant (pKa) of 1 to 30 in water.

A material including silicon particle (Si phase) undergoes very significant expansion and contraction during charge/discharge, and it is therefore necessary to use a poly(meth)acrylic acid as the binder. Poly(meth)acrylic acids have high binding capacity, and are highly effective in suppressing the expansion and contraction of the negative electrode material LSX during charge/discharge. Oil the other hand, poly(meth)acrylic acids bind LSX particles through point binding, so that the surfaces of LSX particles tend to be exposed, and the alkalis are prone to dissolve out of the surfaces. The lager the ratio of the Si phase in the negative electrode material LSX, the more significant the expansion and contraction of the negative electrode material LSX during charge/discharge became. Accordingly, cracks are formed in the lithium silicate phase during charge/discharge, and the alkalis are prone to dissolve out of the LSX particles. If the amount of the poly(meth)acrylic acid used is increased, the effect of suppressing the expansion and contraction of the LSX particles is increased. However, the flexibility of the electrode plate is significantly lowered, so that the electrode plate tends to be degraded, resulting in a significant reduction in the cycle characteristics. The reduction in the cycle characteristics or the gas generation during high-temperature storage is hardly a problem when the ratio of the silicon particles in LSX is less than 30 mass %, but is a unique problem that becomes remarkable when the ratio of the silicon particles is 30 mass % or more.

Carboxyalkyl celluloses have a small binding force, and it is difficult to reduce the stress caused by the expansion and contraction of the LSX particles during charge/discharge. However, carboxyalkyl celluloses adhere to the LSX particles so as to thinly cover the surfaces of the particles, and therefore can suppress the alkali dissolution to sane extent. However, when used excessively, carboxyalkyl celluloses cover the surfaces of the LSX particles too extensively, resulting in a reduction in the ratio of the active material in the electrode plate of the negative electrode, and hence a reduction in the negative electrode capacity. Therefore, it is difficult to suppress the alkali dissolution to such au extent that the gas generation is suppressed when the battery is stored at a high temperature.

In the present embodiment, the above-described amounts of a poly(meth)acrylic acid and a carboxyalkyl cellulose are used, and a run-aqueous electrolyte inducting an acid exhibiting the above-described pKa in water at 25° C. is used. Accordingly, although the negative electrode material LSX includes an amount of silicon particles as large as 30 masse or more, and tends to cause the alkali dissolution, it is possible to neutralize alkalis that have dissolved out of the negative electrode material LSX with the acid, thus suppressing the gas generation when the battery is stored at a high temperature. Furthermore, it is not necessary to excessively use a poly(meth)acrylic acid in order to suppress the alkali dissolution, so that it is possible to suppress the degradation of the electrode plate, thereby achieving excellent cycle characteristics.

The acid may be any acid that exhibits the above-described pKa in water at 25° C. When the acid has a plurality of pKa values, at least one pKa may be in the above-described range, or all or part of the plurality of pKa values may be in the above-described range.

Hereinafter, a non-aqueous electrolyte secondary battery according to the present embodiment will be described in detail.

(Negative Electrode)

A negative electrode used for the non-aqueous electrolyte secondary battery is capable of electrochemically absorbing and desorbing lithium. The negative electrode includes a negative electrode material, a binder, and a thickener.

(Negative Electrode Material)

The negative electrode material LSX includes a lithium silicate phase, and silicon particles dispersed in the lithium silicate phase. Preferably, the negative electrode material LSX forms a particulate material (also referred to as "LSX particles"). Preferably, the silicon particles are substantially uniformly dispersed in the lithium silicate phase. For example, the LSX particles have an island-in-the-sea structure in which fine silicon particles are dispersed in a matrix of the lithium silicate phase.

The lithium silicate phase does not have many sites that can react with lithium, and therefore is less prone to cause a new irreversible reaction during charge/discharge. The silicon particles have a particulate phase (Si phase) of a simple substance of silicon (Si). The silicon particles in the negative electrode material LSX can absorb a large amount of lithium ions, and thus contributes to an increase in the capacity of the negative electrode.

Preferably, the lithium silicate phase has a composition represented by the formula: $Li_2O \cdot xSiO_2$. Here, x satisfies, for example, $0.5 \leq x \leq 20$, preferably $2 \leq x \leq 18$, more preferably $2.1 \leq x \leq 18$ or $4 \leq x \leq 18$. When x is in such a range, it is possible to further increase the effect of suppressing the alkali dissolution.

Specific examples of the composition of the lithium silicate phase include $Li_2O \cdot 0.5SiO_2$, $Li_2O \cdot SiO_2$, $Li_2O \cdot 2SiO_2$, $Li_2O \cdot 3SiO_2$, $Li_2O \cdot 10SiO_2$, and $Li_2O \cdot 18SiO_2$.

Although the crystallite size of the silicon particles is not particularly limited, it is preferable that the silicon particles are composed of crystallites having a crystallite size of 20 nm or less, from the viewpoint of facilitating the suppression of the expansion and contraction of the negative electrode material LSX during charge/discharge. Note that fee crystallite size of the silicon particles is calculated from the half-width of a diffraction peak attributed to the Si (111) plane in an X-ray diffraction (XRD) pattern of the silicon particles, using the Schemer equation.

In view of the fact that cracks are difficult to be formed in the silicon particles, file average particle size of the silicon particles is preferably 500 nm or less, more preferably 200 nm or less, farther preferably 50 inn or less.

Note that the average particle size of the silicon particles is measured by observing a cross-sectional SEM (Scanning Electron Microscope) photograph of the negative electrode material. Specifically, file average particle size of the silicon particles is determined by averaging the maximum diameters of arbitrarily selected 100 silicon particles. The silicon particles are firmed by a plurality of crystallites gathering together.

The ratio of the silicon particles in the negative electrode material is 30 mass % or more, preferably 40 mass % or more, or may be 50 mass % or more. The ratio of the silicon particles in the negative electrode material is preferably 80 mass % or less, more preferably 70 mass % or less or 65 mass % or less. These tower limits and upper limits can be freely combined. The ratio of the silicon particles in the negative electrode material may be, for example, 30 mass % or more and 80 mass % or less, 40 mass % or more and 80 mass % or less, or 40 mass % or more and 70 mass % or less. When the ratio of the silicon particles is in such a range, it is possible to secure a high capacity, however, the alkali dissolution and the degradation of LSX particles are likely to occur with charge/discharge. With the present embodiment even though a negative electrode material LSX including silicon particles at such a high ratio is used, it is possible to suppress the alkali dissolution to suppress the degradation of the LSX particles and the negative electrode by using the binder, the thickener, and the non-aqueous electrolyte having the above-described compositions.

The average particle size of the LSX policies is preferably 1 to 25 μm, more preferably 4 to 15 μm. When the average particle size is in such a range, the stress caused by a volume change of the negative electrode material LSX with charge/discharge can be more easily reduced, thus making it possible to easily achieve good cycle characteristics. Furthermore, the LSX particles have an appropriate surface area, so that the edacity decrease caused by a side reaction with the non-aqueous electrolyte is also suppressed.

The average particle size of the LSX particles means a particle size (volume average particle size) with which an accumulated volume value is 50% in a particle size distribution measured by the laser diffraction/scattering method. As the measurement apparatus, it is possible to use, for example, an "LA-750" manufactured by HORIBA, Ltd. (HORIBA).

The negative electrode material LSX can be obtained, for example, by mixing silicon dioxide with a lithium compound, firing the resulting mixture to form lithium silicate, and finning a composite of the lithium silicate and silicon serving as the raw material.

The composition of the lithium silicate can be adjusted by adjusting the feeding amounts of the silicon dioxide and the lithium compound. For example, lithium carbonate, lithium oxide, lithium hydroxide, and/or lithium hydride can be used as the lithium compound. Firing of the mixture can be performed, for example, by heating the mixture in the air at 400° C. to 1200° C.

The lithium silicate and the raw material silicon are mixed prior to the formation of a composite thereof and each of the lithium silicate and the raw material silicon may be ground to have an appropriate particle size before being mixed. The composition of the negative electrode material LSX can be adjusted by adjusting the mixing ratio (mass ratio) of the lithium silicate and the raw material silicon.

The composite formation can be performed, for example, by grinding the mixture of the lithium silicate and the raw material silicon while applying shearing force to the mixture. Bis preferable to apply a pressure to the ground mixture to compress the mixture, and further grind the mixture. The pressure applied during compression is preferably 10 MPa or more, more preferably 40 MPa or more. During compression, it is preferable to apply a temperature of 600° C. to 1000° C. Compression can be performed, for example, using a hot pressing machine. The LSX particles tins obtained are classified as needed. If necessary, the LSX particles may be washed with an aqueous acidic solution containing au inorganic acid or an organic acid.

Preferably, the LSX particles include a conductive material that coats at least a portion of the surfaces thereof. Due to the poor electronic conductivity of the lithium silicate phase, the conductivity of the LSX particles also tend to be low. On the other hand, the conductivity can be dramatically increased by coating the surfaces of the LSX particles with a conductive material. A conductive layer having a thickness small enough not to substantially affect the average particle size of the LSX particles is preferable. As the conductive material it is preferable to use a carbon material and the conductive agents described below may be used. Coating with the conductive material may be performed, for example, by the CVD method using a hydrocarbon gas such as acetylene or methane as the raw material or a method involving mixing coal pitch, petroleum pitch, phenol resin, or the like with the LSX particles, and carbonizing the mixture by heating. Alternatively, it is possible to cause, for example, carbon blade to adhere to the surfaces of the LSX particles.

The negative electrode includes, as the negative electrode active material, a negative electrode material LSX (or LSX particles) as an essential component. Preferably, the negative electrode further includes, as the negative electrode active material a carbon material that electrochemically absorbs and desorbs lithium. By using the negative electrode material LSX and the carbon material in combination, it is possible to suppress the occurrence of a contact failure between the negative electrode active material and the negative electrode current collector with charge/discharge, white providing the negative electrode with the high capacity of the silicon particles, thus making it possible to further enhance the cycle characteristics.

Examples of the carbon material include graphite, graphitizable carbon (soft carbon), and hardly graphitizable carbon (hard carbon). Among these, graphite is preferable because of the excellent stability of charge/discharge and the small irreversible capacity. Graphite means a material having a graphite crystal structure, and includes, for example, natural graphite, artificial graphite, and graphitized mesophase carbon particles. The carbon materials may be used alone or in a combination of two or more.

The ratio of the negative electrode material LSX to the total of the negative electrode material LSX and the carbon material is, for example, preferably 0.1 mass % or more and 30 mass % or less, more preferably 0.5 mass % or more and 25 mass % or less. This makes it even easier to achieve both a high capacity and excellent cycle characteristics.

(Binder)

The binder includes at least a poly(meth)acrylic acid.

Examples of poly(meth)acrylic acids include poly(meth)acrylic acid and a salt thereof. Examples of poly(meth)acrylic acid include polyacrylic acid, polymethacrylic acid, and a copolymer (an acrylic acid-methacrylic acid copolymer, an ethylene-acrylic acid copolymer, etc.) including repeating units of acrylic acid and/or methacrylic acid Examples of the salt of poly(meth)acrylic acid include alkali metal salts such as a sodium salt, and ammonium salts. The poly(meth)acrylic acids may be used alone or in a combination of two or more. Note that, in the copolymer, the total of acrylic acid units and methacrylic acid units is preferably 50 mol % or more, more preferably 80 mol % or more.

The binder may include a binder (second binder) other than poly(meth)acrylic acids (first binder). Examples of the second binder include fluorocarbon resins such as polytetrafluoroethylene, and polyvinylidene fluoride; polyolefin resins such as polyethylene and polypropylene; polyamide resins such as aramid resin, polyimide resins such as polyimide and polyamide imide, acrylic resins (excluding poly(meth)acrylic acids) such as polymethyl acrylate; vinyl resins such as polyacrylonitrile and polyvinyl acetate; polyvinyl pyrolidone; polyethersulfone; and a rubber-like material such as a styrene-butadiene copolymer rubber (SBR). The second binders may be used alone or in a amination of two or more.

The amount of the binder relative to 100 parts by mass of the negative electrode material is, for example, 0.1 parts by mass or more and 10 parts by mass or less, preferably 0.1 parts by mass or more and 5 parts by mass or less, more preferably 0.1 parts by mass or more and 3 parts by mass or less. When the amount of the binder is in such a range, a sufficient binding capacity can be achieved, and an excessive increase in the resistance of the negative electrode can be suppressed.

The amount of the poly(meth)acrylic acid (first binder) relative to 100 parts by mass of the negative electrode material is 0.1 parts by mass or more and 5 parts by mass or less, preferably 0.1 parts by mass or more and 4 parts by mass or less, more preferably 0.1 parts by mass or more and 3 parts by mass or less. When the amount of the poly(meth)acrylic acid exceeds 5 parts by mass, the flexibility of the negative electrode is lowered, and the negative electrode is likely to be degraded with charge/discharge, so that the cycle characteristics are reduced. When the amount of the poly(meth)acrylic acid is less than 0.1 parts by mass, the stress resulting from the expansion and contraction of the LSX particles during charge/discharge cannot be reduced even with the use of the second binder, and the LSX particles are degraded, resulting in reduced cycle characteristics.

The amount of the poly(meth)acrylic acid relative to 100 parts by mass of the carboxyalkyl cellulose is, for example, 10 parts by mass or more and 150 parts by mass or less, preferably 10 parts by mass or more and 100 parts by mass or less, more preferably 10 parts by mass or more and 70 parts by mass or less, or 20 parts by mass or more and 60 parts by mass or less. When the amount of the poly(meth) acrylic acid is in such a range, the effect of suppressing the alkali dissolution can be further increased, and the effect of suppressing the degradation of the negative electrode (hiring charge/discharge can be further enhanced.
(Thickener)

The thickener includes at least a carboxyalkyl cellulose.

The carboxyalkyl celluloses include, for example, carboxyalkyl cellulose and a salt thereof. Examples of the carboxyalkyl cellulose include carboxy $C_{1-4}$ alkyl cellulose such as carboxymethyl cellulose (CMC) and carboxyalkyl ethylcellulose, and it is preferable to use caboxy $C_{1-2}$ alkyl cellulose. Note that "$C_{1-4}$" and "$C_{1-2}$" represent the number of carbons of the alkyl group portion of a carboxyalkyl group bonded to the cellulose skeleton. Examples of the salt of the carboxyalkyl cellulose include alkali metal salts such as a sodium salt, and ammonium salts.

The thickener may include a thickener (second thickener) other than carboxyalkyl celluloses (first thickener). Examples of the second thickener include alkyl cellulose such as methyl cellulose; saponified products of polymers having vinyl acetate units, such as polyvinyl alcohol; and polyethers (polyalkylene oxides such as polyethylene oxide, etc.). The second thickeners may be used alone or in a combination of two or more.

The amount of the thickener relative to 100 parts by mass of the negative electrode material is, for example, 0.1 parts by mass or more and 10 parts by mass or less, preferably 1 part by mass or more and 5 parts by mass or less, more preferably 1 part by mass or more and 3 parts by mass or less. When the amount of the thickener is in such a range, a high capacity can be easily secured, and the dispersability of the binder and the negative electrode material LSX or the carbon material can be easily enhanced.

The amount of the carboxyalkyl cellulose (first thickener) relative to 100 parts by mass of the negative electrode material is, for example, 1 part by mass or more and 5 parts by mass or less, preferably 1 part by mass or more and 4 parts by mass or less, more preferably 1 part by mass or more and 3 parts by mass or less. When the amount of the carboxyalkyl cellulose is in such a range, the effect of suppressing the alkali dissolution can be further increased, and high cycle characteristics can be easily achieved
(Conductive Agent)

The negative electrode may further include a conductive agent. Examples of the conductive agent include carbon blades such as acetylene black; conductive fibers such as carbon fiber and metal fiber carbon fluoride; metal powders such as aluminum powder, conductive whiskers such as zinc oxide acid potassium titanate; conductive metal oxides such as titanium oxide; and organic conductive materials such as a phenylene derivative. These may be used alone or in a combination of two or more. As described above, the surfaces of the LSX particles may be coated with the conductive agent.

The negative electrode includes, for example, a negative electrode current collector, and a negative electrode material mixture layer that is finned on the surface of the negative electrode current collector, and that includes a negative electrode active material. The negative electrode material mixture layer can be formed by applying, to the surface of the negative electrode current collector, a negative electrode slurry in which the negative electrode material mixture is dispersed in a dispersing medium, and drying the slurry. The coating film obtained after drying may be optionally idled. The negative electrode material mixture layer may be formed on one surface of the negative electrode current collector, or may be formed on both surfaces thereof.

A non-porous conductive substrate (metal foil, etc.) or a porous conductive substrate (a mesh structure, a net structure, a punched sheet etc.) is used as the negative electrode current collector. Examples of the material of the negative electrode current collector include stainless steel, nickel, a nickel alloy, copper, and a copper alloy. The thickness of the negative electrode current collector is, but is not particularly limited to, preferably 1 to 50 μm, mero preferably 5 to 20 μm, from the viewpoint of the balance between the strength and the weight reduction of the negative electrode.

The negative electrode material mixture includes a negative electrode active material (a negative electrode material LSX, and optionally a carbon material), a binder, a thickener, and optionally a conductive agent, a known additive, and the like.

The dispersing medium in which the negative electrode material mixture is dispersed is, but is not particularly limited to, for example, water, alcohol such as ethanol, ether such as tetrahydrofuran, amide such as dimethylfomamide, N-methyl-2-pyrrolidone (NMF), or a solvent mixture thereof
(Positive Electrode)

The positive electrode includes, for example, a positive electrode current collector, and a positive electrode material mixture layer that is formed on the surface of the positive electrode current collector. The positive electrode material mixture layer can be formed by applying, to the surface of the positive electrode current collector, a positive electrode slurry in which the positive electrode material mixture is dispersed in a dispersing medium, and drying the shiny. The coating film obtained after drying may be optionally rotted. The positive electrode material mixture layer may be formed on one surface of the positive electrode current collector, or may be formed on both surfaces thereof.

A lithium composite metal oxide can be used as the positive electrode active material. Examples thereof include $Li_aCoO_2$, $Li_aNiO_2$, $Li_aMnO_2$, $Li_aCo_bNi_{1-b}O_2$, $Li_aCo_bM_{1-b}O_c$, $Li_aLi_{1-b}M_bO_c$, $Li_aMn_2O_4$, $Li_aMn_{2-b}M_bO_4$, $LiMePO_4$, $Li_2MePO_4$ (M is at least one of Na, Mg, Sc, Y, Mn, Fe, Co, Ni, Cu, Zn, Al, Cr, Pb, Sb, and B). Here, a=0 to 1.2, b=0 to 0.9, and C=2.0 to 2.3. Note that the value "a", which represents the molar ratio of lithium, is a value obtained immediately after the fabrication of the active material, and increases or decreases through charge-discharge.

The bonder and the conductive agent can be selected from the same materials as those given as the examples for the negative electrode. As the conductive agent graphite such as natural graphite or artificial graphite may be used.

The shape and the thickness of the positive electrode current collector can be respectively selected from the shape and the range corresponding to the negative electrode current collector. Examples of the material of the positive electrode current collector include stainless steel aluminium, an aluminum alloy, and titanium.
(Non-Aqueous Electrolyte)

The non-aqueous electrolyte includes a non-aqueous solvent, a lithium salt dissolved in the non-aqueous solvent, and an acid that exhibits a pKa of 1 to 30 in water at 25° C. The non-aqueous electrolyte may contain a known additive. As a result of the non-aqueous electrolyte including the above-described acid, even if alkalis dissolve out of the negative electrode material LSX they are neutralized by the acid. Accordingly, it is possible to suppress the generation of gas when the battery is stored at a high temperature.

The acid may be any proton-donating substance as long as the substance has the above-described pKa. As the acid, it is possible to use acids called Bronsted acids, and those that can be dissolved in a non-aqueous solvent are preferable.

The pKa, in water at 25° C., of the acid is 1 to 30, preferably 1 to 20, more preferably 1.5 to 17. When the pKa of the acid is in such a range, the effect of neutralizing alkalis that have dissolved out of the LSX can be sufficiently achieved, so that it is possible to suppress the generation of gas during high-temperature storage. Furthermore, it is possible to inhibit an SiO layer from being formed too extensively on the surfaces of the LSX particles, so that it is possible to suppress an increase in the resistance.

Examples of the acid having the above-described pKa include caboxylic acid, acid anhydride, phenols, and carbon acid. The acids may be used alene or in a combination of two or more.

Examples of the carboxylic acid include monocarboxylic acids such as formic acid acetic acid, cyclohexane carboxylic acid, and benzoic acid; and polycarboxylic acids such as malonic acid, oxalic acid, succinic acid, maleic acid, fumaric acid, and phthalic acid. The carboxylic acid may be any of aliphatic carboxylic acid, alicyclic carboxylic acid, and aromatic carboxylic acid. The acid anhydride may be an anhydride in which a plurality of carboxylic acid molecules are condensed with each other, and is preferably an acid anhydride of polycarboxylic acid. Examples of the acid anhydride of polycarboxylic acid include succinic anhydride, maleic anhydride, and phthalic anhydride.

Examples of the phenols include phenol and hydroxy toluene.

Examples of the carbon acid include triacetylmethane, diacetylmethane, acetylmethane, acetylacetone, dimedone, 1,3-dioxolane, nitromethane, malononitrile, dicyanomethane, cyanomethane, and cyclopentadiene.

Among these, polycarboxylic acid or an acid anhydride thereof is particularly preferable from the viewpoint of the high effect of reducing the generation of gas during high-temperature storage. The total ratio of the polycarboxylic acid and the acid anhydride thereof in all acids is preferably 80 mass % or more, more preferably 90 mass % or more. As the acid, it is possible to use only polycarboxylic acid, only polycarboxylic acid anhydride, or only polycarboxylic acid and polycarboxylic acid anhydride.

The concentration of the acid in the non-aqueous electrolyte is, for example, 0.01 to 7 mass %, preferably 0.5 to 6 mass %, more preferably 0.1 to 5 masse or 0.1 to 2 mass %, When the concentration of the acid is in such a range, the effect of suppressing the generation of gas during high-temperature storage can be further increased.

Note that the concentration of the acid in the non-aqueous electrolyte is preferably within the above-described range at least in the initial state of the battery. The battery in the initial state refers to a battery that has undergone the first charge following break-in charge/discharge after the assembly of the battery, and a commercially available battery in the chained state, for example, also can be called the battery in the initial state.

As the non-aqueous solvent, it is possible to use, for example, cyclic carbonic acid ester, chain carbonic acid ester, and cyclic carboxylic acid ester. Examples of the cyclic carbonic acid ester include propylene carbonate (PC), ethylene carbonate (EC), fluoroethylene carbonate (FEC), and fluoropropylene carbonate. Examples of the chain carbonic acid ester include diethyl carbonate (DEC), ethyl methyl carbonate (EMC), and dimethyl carbonate (DMC). Examples of the cyclic carboxylic acid ester include γ-butyrolactone (GBL) and γ-valerolactone (GVL). The non-aqueous solvents may be used alone or in a combination of two or more.

As the lithium salt, it is possible to use, for example, lithium salts of chlorine-containing acid ($LiClO_4$, $LiAlCl_4$, $LiB_{10}Cl_{10}$, etc.), lithium salts of fluorine-containing acid ($LiPF_6$, $LiBF_4$, $LiSbF_6$, $LiAsF_6 LiCF_3SO_3$, $LiCF_3CO_2$, etc.), lithium salts of fluorine-containing acid imide ($LiN(CF_2SO_2)_2$, $LiN(CF_3SO_2)(C_4F_9SO_2)$, $LiN(C_2F_5SO_2)_2$, etc.), and lithium halides (LiCl, LiBr, LiI, etc.). The lithium salts may be used alone or in a combination of two or more.

The concentration of the lithium salt in the non-aqueous electrolyte is, for example, 0.5 to 2 mol/L.

For the propose of improving the charge/discharge characteristics of the battery, an additive may be added to the non-aqueous electrolyte. Examples of the additive include vinylene etabonate (VC), vinyl ethylene carbonate, cyclohexylbenzene (CHB), fluorobenzene, and methyl phenyl carbonate. The amount of the additive in the non-aqueous electrolyte is, for example, 0.01 to 15 mass %, and may be 0.05 to 10 mass %.

(Separator)

Usually, it is desirable that a separator is interposed between a positive electrode and a negative electrode. The separator has a high ion permeability, and appropriate mechanical strength and insulating properties. As the separator, it is possible to use a microporous thin film, a woven fabric, anon-woven fabric, and the like. Polyolefins such as polypropylene and polyethylene are preferable as the material of the separator.

An exemplary structure of the non-aqueous electrolyte secondary battery includes a structure in which an electrode group formed by winding a positive electrode and a negative electrode with a separator interposed therebetween, and a non-aqueous electrolyte are housed in an outer case. Alternatively, an electrode group having another configuration, such as a stacked electrode group formed by stacking a positive electrode and a negative electrode with a separator interposed therebetween, may be applied in place of the wound electrode group. For example, the lion-aqueous electrolyte secondary battery may have any of a cylindrical configuration, a square configuration, a coin configuration, a button configuration, and a laminated configuration.

FIG. 1 is a partially cut-away schematic perspective view of a square non-aqueous electrolyte secondary battery according to an embodiment of the present invention.

The battery includes a square battery case 6 having a bottom, and an electrode group 9 and a non-aqueous electrolyte (not shown) that are housed in the battery case 6, The electrode group 9 includes a long strip-shaped negative electrode, a long strip-shaped positive electrode, and a separator that is interposed therebetween and prevents a direct contact therebetween. The electrode group 9 is formed by winding the negative electrode, the positive electrode, and the separator around a flat plate-shaped winding core, and pulling out the winding core.

An end of a negative electrode lead 14 is attached to a negative electrode current collector of the negative electrode through welding or the like. An end of a positive electrode lead 11 is attached to a positive electrode current collector of the positive electrode through welding or the like. The other end of the negative electrode lead 14 is electrically connected to a negative electrode terminal 13 provided on a sealing plate 5. The other end of the positive electrode lead 11 is electrically connected to the battery case 6 also serving as the positive electrode terminal. A resin frame body 4 that isolates the electrode group 9 and the sealing plate 5 from each other and also isolates the negative electrode lead 14 and the battery case 6 from each other is disposed at an upper portion of the electrode group 9. Then, an opening of the battery case 6 is sealed by the sealing plate 5.

EXAMPLES

Hereinafter, the present invention will be specifically described by way of examples and comparative examples. However, the present invention is not limited to the following examples.

Example 1

(1) Fabrication of Negative Electrode

LSX particles A1 and graphite were mixed at a mass ratio of 15:85, and the mixture was used as a negative electrode active material A1. The negative electrode active material A1, polyacrylic acid (PAA), serene-butadiene rubber (SBR), and sodium carboxymethyl cellulose (CMC-Na) were mixed such that PAA was 0.5 parts by mass, SBR was 0.5 parts by mass, CMC-Na was 1.1 parts by mass relative to 100 parts by mass of the LSX particles A1. After adding water to the mixture, the mixture was stored using a mixer (T.K. HINTS MIX manufactured by PRIMIX Corporation), to prepare a negative electrode shiny. Next the negative electrode slurry was applied to the surface of a copper foil such that the mass of the negative electrode material mixture per 1 $m^2$ of the copper foil was 190 g, and the coating film was dried, followed by rolling to fabricate a negative electrode in which a negative electrode material mixture layer having a density of 1.5 $g/cm^3$ was formed on both surfaces of the copper foil.

As the LSX particles A1, particles (average particle size 10 μm) of the negative electrode material LSX in which silicon particles having an average particle size of 100 nm were substantially uniformly dispersed in a matrix composed of $Li_2O.2SiO_2$, and a conductive layer that coats the particles are used. The conductive layer was formed by mixing the particles of the negative electrode material LSX with coal pilch (MCP250 manufactured by JFE Chemical Corporation), and firing the mixture for 5 hours at 800° C. under an inert atmosphere. The coating amount of the conductive layer was 5 mass % to the total mass of the LSX particles and the conductive layer. The ratio of the silicon particles in the LSX particles was 55 mass %.

Note that the above-described particles of the negative electrode material LSX were fabricated by following a procedure as described below. First, a Si powder having an average particle size of 10 μm, and a lithium silicate powder having an average particle size of 10 μm were mixed at a mass ratio of 55:45. Ned, the resulting mixture was ground using a ball mill, and pulverized until the average particle size was about 100 nm. Using a hot pressing machine, the resulting powder was compressed by application of a pressure of 500 MPa at a temperature of 800° C. The compressed mixture was ground, and classified using a sieve, thus obtaining LSX particles having an average particle size of 10 μm.

(2) Fabrication of Positive Electrode

Lithium cobaltate, acetylene black, and polyvinylidene fluoride were nixed at a mass ratio of 95:2.5:2.5, and N-methyl-2-pyrrolidone (NMF) was added thereto. Thereafter, the mixture was stirred using a mixer (T.K.HIVIS MIX manufactured by PRIMIX Corporation), to prepare a positive electrode slurry. Next the positive electrode slurry was applied to the surface of an aluminum foil, and the coating film was dried, followed by rolling, to fabricate a positive electrode in which a positive electrode material mixture layer having a density of 3.6 $g/cm^3$ was formed on both surfaces of the aluminum foil.

(3) Preparation of Non-Aqueous Electrolyte

In a solvent mixture including EC, EMC, and DMC at a volume ratio of 30.20:50, $LiPF_6$ and succinic anhydride were dissolved such that the concentrations were 1.0 md/L and 0.5 mass %, respectively, to prepare a non-aqueous electrolyte.

(4) Fabrication of Non-Aqueous Electrolyte Secondary Battery

A tab was attached to each of the electrodes, and the positive electrode and the negative electrode were spirally wound with a separator interposed therebetween such that the tabs were located at the outermost peripheral portion, to fabricate an electrode group. The electrode group was inserted into an outer case made of an aluminum laminate film, and the whole was vacuum dried for 2 hours at 105° C. Thereafter, a non-aqueous electrolyte was injected into the outer case, and the opening of the cuter case was sealed to obtain a battery A1.

Comparative Example 1

A non-aqueous electrolyte was prepared m the same manner as in Example 1 except that no succinic anhydride was added. Apart from this, a battery B1 was fabricated in the same manner as in Example 1.

Comparative Example 2

A negative electrode was fabricated in the same manner as in Example 1 except that PAA was not used, and that the amount of SBR relative to 100 parts by mass of the LSX particles was changed to 0.7 parts by mass. The same nonaqueous electrolyte as that used for Comparative Example 1 was used. Apart from these, a battery B2 was fabricated in the same manner as in Example 1.

A negative electrode was fabricated in the sameMiff as in Example 1 except that PAA was not used. Apart from this, a battery B3 was fabricated in the same manner as in Example 1.

Comparative Example 4

As LSX particles A4, LSX particles in winch the ratio of silicon particles was 28 mass %, and that had a conductive layer formed on the surfaces of the particles as in the case of Example 1 were used. In the LSX particles A4, silicon particles having an average particle size of 100 nm were substantially uniformly dispersed in a matrix composed of $Li_2O.2SiO_2$. The LSX particles A4 were fabricated in the same manner as in Example 1 except for using a mixture obtained by mixing a Si powder having an average particle size of 10 μm with a lithium silicate powder having an average particle size of 10 μm at a mass ratio of 28:72. The same non-aqueous electrolyte as that used for Comparative Example 1 was used. Apart from these, a battery B4 was fabricated in the same manner as in Example 1.

Examples 2 to 6

The mass ratios of PAA, SBR, and CMC-Na relative to 100 parts by mass of the LSX particles were changed as shown in Table 1. In place of succinic anhydride, the acids shown in Table 1 were used at the concentrations shown in Table 1. Apart from these, batteries A2 to A6 were fabricated in the same manner as in Example 1.

Comparative Examples 5 and 6

The mass ratios of PAA, SBR, and CMC-Na relative to 100 parts by mass of the LSX particles were changed as shown in Table 1. The same non-aqueous electrolyte as that used for Comparative Example 1 was used. Apart from these, batteries B5 and B6 were fabricated in the same manner as ill Example 1.

Each of the batteries of Examples 1 to 6 and Comparative Examples 1 to 6 was evaluated by the following method. The evaluation results are shown in Table 2.

[Battery Capacity]
<Charge>

A constant current charge was performed with a current of 1 It (800 mA) until the voltage reached 4.2 V, followed by a constant voltage charge with a constant voltage of 4.2 V until the current reached ½0 It (40 mA).

<Discharge>

A constant current discharge was performed with a current of 1 It (800 mA) until the voltage reached 2.75 V.

The rest period between charge and discharge was 10 minutes. Under the above-described charge/discharge conditions, the discharge capacity at the 1st cycle was measured as the battery capacity for each of the batteries.

[Cycle Test]

A cycle test was performed under the above-described charge/discharge conditions for each of the batteries. The ratio of the discharge capacity at the 300th cycle to the discharge capacity at the 1st cycle was determined as the cycle retention rate.

[Gas Generation Amount]

After each of the batteries was charged under the above-described conditions, the battery was stored for 60 days at 50° C. After storage, the volume (gas generation amount) of the gas accumulated in the battery was measured by a buoyancy method.

TABLE 2

| | Evaluation | | |
|---|---|---|---|
| | Battery capacity (mAh) | Cycle retention rate (%) | Gas generation amount (ml) |
| A1 | 2619 | 82 | 15 |
| A2 | 2654 | 75 | 18 |
| A3 | 2606 | 85 | 14 |
| A4 | 2592 | 83 | 18 |
| A5 | 2611 | 79 | 18 |
| A6 | 2608 | 85 | 14 |
| B1 | 2677 | 55 | 58 |
| B2 | 2588 | 28 | 56 |
| B3 | 2737 | 30 | 52 |
| B4 | 1600 | 78 | 20 |
| B5 | 2576 | 32 | 20 |
| B6 | 2611 | 69 | 55 |

As shown in Tables 1 and 2, the batteries of the examples generated a smaller amount of gas after the batteries had been stored at 50° C., and also had a higher cycle retention rate during charge/discharge. Oil the other hand. Comparative Examples 1 to 3 and Comparative Examples 5 to 6 showed significantly reduced cycle characteristics, or had a markedly increased amount of gas generation, as compared with the examples.

Comparative Example 4, in which the ratio of the silicon particles was less than 30 mass %, achieved the cycle characteristics and the gas generation suppressing effect comparable to those of the examples, even though the non-aqueous electrolyte included no acid. That is, it can be said that the reduction in the cycle characteristics and the increase in the gas generation amount are problems unique to cases where the ratio of the silicon particles is 30 mass % or more.

INDUSTRIAL APPLICABILITY

A non-aqueous electrolyte secondary battery according to the present embodiment generates a smaller amount of gas during high-temperature storage, and has excellent cycle characteristics despite having a high capacity. Accordingly,

TABLE 1

| | Negative electrode | | | | Acid | | |
|---|---|---|---|---|---|---|---|
| | Si particles/ LSX particles (mass %) | PAA (parts by mass)/ LSX particles (100 parts by mass) | SBR (parts by mass)/ LSX particles (100 parts by mass) | PAA (parts by mass)/ CMC-Na (100 parts by mass) | Type | pKa | Concentration (mass %) |
| A1 | 55 | 0.5 | 0.5 | 45 | Succinic anhydride | 4.19 5.48 | 0.5 |
| A2 | | 0.25 | 0.5 | 23 | Benzoic acid | 4.2 | 5.0 |
| A3 | | 0.6 | 0.5 | 55 | Maleic anhydride | 1.93 6.58 | 0.5 |
| A4 | | 0.7 | 0.5 | 64 | Phthalic anhydride | 2.95 5.41 | 0.5 |
| A5 | | 0.15 | 0.5 | 14 | Acetylacetone | 9 | 0.5 |
| A6 | | 0.15 | 0.5 | | Cyclopentadiene | 16 | 0.5 |
| B1 | | 0.15 | 0.5 | | — | — | 0.0 |
| B2 | | 0 | 0.7 | 0 | — | — | 0.0 |
| B3 | | 0 | 0.5 | 0 | Succinic anhydride | 4.19 5.48 | 0.5 |
| B4 | 28 | 0 | 0.5 | 0 | — | — | 0.0 |
| B5 | 55 | 0.8 | 0.5 | 73 | — | — | 0.0 |
| B6 | | 0.5 | 0.5 | 45 | — | — | 0.0 | the non-aqueous electrolyte secondary battery is useful for main power supplies such as a mobile communication device and a portable electronic device.

REFERENCE SIGNS LIST

4 . . . Frame body
5 . . . Sealing plate
6 . . . Battery case
9 . . . Electrode group
11 . . . Positive electrode lead
13 . . . Negative electrode terminal
14 . . . Negative electrode lead

The invention claimed is:

1. A non-aqueous electrolyte secondary battery comprising: a positive electrode capable of electrochemically absorbing and desorbing lithium, a negative electrode capable of electrochemically absorbing and desorbing lithium; and a non-aqueous electrolyte,
   wherein the negative electrode includes a negative electrode material, a binder, and a thickener,
   the negative electrode material includes an LSX particle including a lithium silicate phase, and silicon particles dispersed in the lithium silicate phase,
   a ratio of the silicon particles in the LSX particle is 30 mass % or more,
   the binder includes a poly(meth)acrylic acid alkali metal salt,
   the thickener includes a carboxyalkyl cellulose,
   an amount of the poly(meth)acrylic acid alkali metal salt relative to 100 parts by mass of the negative electrode material is 0.1 parts by mass or more and 5 parts by mass or less, and
   the non-aqueous electrolyte includes a lithium salt, a non-aqueous solvent that dissolves the lithium salt, and an acid that exhibits a pKa of 1 to 30 in water at 25 °C.,
   wherein a concentration of the acid in the non-aqueous electrolyte is 0.01 to less than 0.05 mass %, wherein the concentration of the acid in the non-aqueous electrolyte exists at least in an initial state of the battery,
   wherein the acid includes polycarboxylic acid, and
   wherein the polycarboxylic acid is selected from malonic acid, oxalic acid, fumaric acid, phthalic acid, or combinations thereof.

2. The non-aqueous electrolyte secondary battery according to claim 1,
   wherein the acid has a pKa of 1 to 20.

3. The non-aqueous electrolyte secondary battery according to claim 1,
   wherein an amount of the carboxyalkyl cellulose relative to 100 parts by mass of the negative electrode material is 1 part by mass or more and 5 parts by mass or less.

4. The non-aqueous electrolyte secondary battery according to claim 1,
   wherein an amount of the poly(meth)acrylic acid alkali metal salt relative to 100 parts by mass of the carboxyalkyl cellulose is 10 parts by mass or more and 150 parts by mass or less.

5. The non-aqueous electrolyte secondary battery according to claim 1,
   wherein a ratio of the silicon particles in the negative electrode material is 80 mass % or less.

6. The non-aqueous electrolyte secondary battery according to claim 1,
   wherein a composition of the lithium silicate phase is represented by the formula: $Li_2O \cdot xSiO_2$, and satisfies $0.5 \leq x \leq 20$.

7. The non-aqueous electrolyte secondary battery according to claim 1,
   wherein the carboxyalkyl cellulose is carboxy $C_{1-2}$ alkyl cellulose or a salt thereof.

8. The non-aqueous electrolyte secondary battery according to claim 1,
   wherein the negative electrode further includes a carbon material that electrochemically absorbs and desorbs lithium, and
   a ratio of the negative electrode material to a total of the negative electrode material and the carbon material is 0.1 mass % or more and 30 mass % or less.

9. The non-aqueous electrolyte secondary battery according to claim 1,
   wherein the lithium silicate phase includes $Li_2O \cdot 0.5SiO_2$.

* * * * *